United States Patent [19]

Berisch

[11] 4,390,213
[45] Jun. 28, 1983

[54] DECELERATION-SENSITIVE BRAKING PRESSURE CONTROL DEVICE

[75] Inventor: Volker Berisch, Hattersheim, Fed. Rep. of Germany

[73] Assignee: ITT Industries, Inc., New York, N.Y.

[21] Appl. No.: 263,669

[22] Filed: May 14, 1981

[30] Foreign Application Priority Data

Jun. 12, 1980 [DE] Fed. Rep. of Germany ....... 3021952

[51] Int. Cl.³ .............................................. B60T 8/14
[52] U.S. Cl. ................................ 303/24 A; 303/24 F
[58] Field of Search ............. 188/349; 303/6 C, 24 R, 303/24 A, 24 C, 24 F

[56] References Cited

U.S. PATENT DOCUMENTS 4,175,791 11/1979 Nogami ............................ 303/24 A Primary Examiner—Duane A. Reger
Attorney, Agent, or Firm—John T. O'Halloran; Alfred C. Hill

[57] ABSTRACT

In a deceleration-sensitive braking pressure control device for a vehicular hydraulic brake system, the smaller active surface of a spring-loaded stepped piston faces an inlet chamber communicating with a brake pressure generator and the larger active surface of the stepped piston faces an outlet chamber which communicates with at least one wheel brake cylinder. The two chambers communicate with each other via a channel disposed coaxially in the stepped piston and a valve, the valve including a closure member movable in a deceleration-sensitive manner disposed in the inlet chamber and a valve seat at the adjacent end of the stepped piston. In the rest position of the stepped piston, a stop for the closure member guarantees a minimum distance between the closure member and the valve seat. This stop is provided at the adjacent end of an axially movable sleeve surrounding the adjacent end of the stepped piston.

14 Claims, 3 Drawing Figures

DECELERATION-SENSITIVE BRAKING PRESSURE CONTROL DEVICE

BACKGROUND OF THE INVENTION

The present invention relates to a deceleration-sensitive braking pressure control device for a vehicular hydraulic brake system wherein the small active surface of a spring-loaded stepped piston is a boundary for an inlet chamber connected with a braking pressure generator while the larger active surface of this piston is a boundary for an outlet chamber connected with at least one wheel brake cylinder. Via a channel, the inlet and outlet chambers communicate with a valve which is formed by a closure member, in particular a ball, disposed in the inlet chamber, which closure member is movable in a deceleration-sensitive manner, and by a valve seat at the adjacent end of the stepped piston. A stop is provided for the closure member, which, in the rest position of the stepped piston, guarantees a minimum distance between the closure member and the valve seat, and the end of the stepped piston adjacent the inlet chamber is surrounded by a sleeve.

In a known device of this type, for instance, German Patent DE-AS No. 2,213,496, the stop for the closure member and the sleeve are arranged so as to be fastened with the housing. With the inlet pressure gradually increasing, the stepped piston will move against the force of its spring towards the inlet chamber due to its different active surfaces. At a predetermined change-over pressure the minimum distance will have been travelled. Now, the valve may close dependent on the deceleration-sensitive movement of the closure member. The valve being closed, the associated second branch of the characteristic curve of the device has a smaller inclination than the first branch while the valve was open. On the side of the closure member opposite the stop there is an abutment fastened to the housing. The distance between the abutment and the stop approximately amounts to twice the axial length of the closure member.

In this construction, the change-over pressure and the inclinations of the branches of the characteristic curve of the pressure depend on each other. This impairs the optimum rating of the braking pressure control device. If, due to a malfunction, the closure member remains at the abutment, the valve will not be effective at all, the device failing altogether and the danger of a lock-up increasing considerably upon an operation of the rear wheel brakes.

SUMMARY OF THE INVENTION

It is an object of the present invention to provide a deceleration-sensitive braking pressure control device of the type referred to above which will enable an independent rating of the change-over pressure and of the inclinations of the branches of the characteristic curve of the pressure without incurring considerable extra expenditure.

A feature of the present invention is the provision of a deceleration-sensitive braking pressure control device for a vehicular hydraulic brake system comprising a housing having a stepped bore coaxial of a longitudinal axis; a stepped piston disposed in the bore coaxial of the axis, the piston including a first section having a relatively small active surface facing a braking pressure inlet chamber disposed in the bore and a second section sealed to and slidable in the bore, the second section having a relatively large active surface facing a braking pressure outlet chamber disposed in the bore; a sleeve disposed in the bore in a slidable sealed relationship therewith encircling a first portion of the first section in a slidable sealed relationship therewith; a first spring disposed in the bore between a first step in the piston joining the first and second sections and the adjacent end of the sleeve to preload the piston; a channel disposed in the piston coaxial of the axis enabling the inlet chamber to communicate with the outlet chamber; a valve including a valve seat disposed adjacent the small active surface in an operative relationship with an adjacent end of the channel and a closure member disposed in the inlet chamber movable therein in an operative relationship with the valve seat in a deceleration-sensitive manner to control the communication between the inlet and outlet chambers; and a stop for the closure member carried by the adjacent end of the sleeve to ensure that in the rest position of the piston a minimum distance is guaranteed between the closure member and the valve seat, the sleeve being displaceable by inlet pressure against the force of the first spring by an amount greater than the minimum distance.

In this construction the ratio of the active surfaces of the stepped piston may exclusively be selected in accordance with the desired inclinations of the branches of the characteristic curve of the pressure of the device. The change-over pressure is not only determined by the displacement of the stepped piston but, additionally, by the opposed displacement of the sleeve. Consequently, the change-over pressure may be chosen freely by rating the active surface of the sleeve or by rating the spring which loads the sleeve.

This construction virtually requires no extra expenditure, since at the maximum an additional seal will be required for the displaceability of the sleeve and, since it will not be necessary for the sleeve to have a spring of its own if, in accordance with a preferred embodiment, the sleeve is displaceable against the force of the stepped piston spring.

In a further embodiment of the present invention it has been provided that the distance between the abutment and the stop will approximately correspond to the length of the closure member and that the abutment will be able to perform a displacement stroke against the force of a weak spring. In this manner, even if the closure member is obstructed, e.g. by unfavorable flow conditions or viscous fluid preventing the closure member from closing in the normal manner, it will be ensured that the valve will close at a pressure which will be achieved when the stepped piston will have travelled the minimum distance, hitting the closure member. This pressure may be chosen so as to ensure in any case that above a predetermined pressure the outlet pressure will increase at a slower rate than the inlet pressure. Thanks to the fact that the abutment is able to perform a displacement stroke there will be no impairment of the movement of the stepped piston in the direction of the inlet chamber, e.g. upon termination of the braking action when there is a depressurization on the outlet chamber side. In order to ensure that upon a reduction of the inlet pressure the valve will be able to open in any case it will be necessary to provide a distance for the displacement stroke which will be long enough for the closure member to be able to lift off of the valve seat even if the stepped piston has moved the longest distance possible in the direction of the inlet chamber.

Further, it will be advantageous for the abutment to press the closure member against the stop in the rest position of the sleeve. Thus, the abutment adopts a position near its own end position. This will mean that in the normal case the closure member will be pressed in a resilient and thus in a vibration-free manner against the stop. If, under the influence of the inlet pressure, the sleeve is displaced, the closure member will be able to perform the valve function without the influence of the weak spring of the abutment, since the latter will soon adopt its own end position.

In particular, the abutment may be formed by a plate separating the inlet chamber from the associated socket and having at least one hole pointing towards the closure member. By means of the pressure medium passing through the hole upon an increase in the pressure in the inlet chamber a force may be exerted on the closure member. The size, number and arrangement of the hole(s) will be chosen so as to achieve relatively neutral flow conditions, or such flow conditions in the inlet chamber which will favor the movement of the ball. The farther the closure member moves away from the abutment the smaller will be the influence of the pressure medium stream. Thus, in the actual valve operation practically no influence will be felt at all.

Further, it will be advantageous for the stroke of the stepped piston to be limited in the direction of the inlet chamber. For instance, it will be possible to limit the stroke of the stepped piston by a stop at the sleeve. This stop will define the largest displacement possible of the stepped piston in the direction towards the inlet chamber. Consequently, the necessary displacement stroke of the abutment will be defined exactly. As a result thereof, a reliably operating device of short axial length will be obtained.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
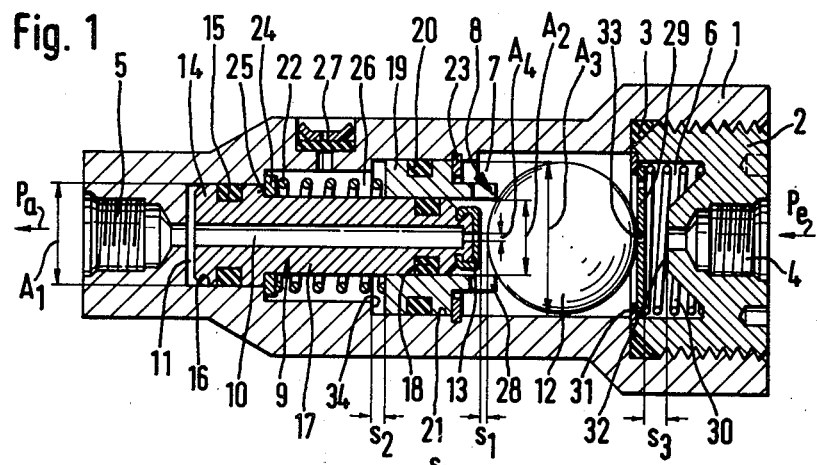
FIG. 1 is a longitudinal cross sectional view of a first embodiment of a deceleration-sensitive braking pressure control device in accordance with the principles of the present invention.

Referring to FIG. 1, the deceleration-sensitive braking pressure control device of the present invention has a housing 1 whose inside space on the inlet port side is closed by a threaded member 2, with a seal 3 being inserted between member 2 and housing 1. The inlet socket 4 is connected with a pressure generator, in particular with a master cylinder of a brake system. It is to this socket that the inlet pressure Pe is supplied. At the opposite end of the housing, an outlet socket 5 is provided which is connected with a brake circuit, e.g. the wheel cylinders of the rear axle of a motor vehicle. It is from outlet socket 5 that the outlet pressure Pa is delivered.

Inlet socket 4 communicates with an inlet chamber 7 via an antechamber 6. Inlet chamber 7 communicates with an outlet chamber 11 via a valve 8 and a channel 10 extending coaxially within a stepped piston 9. Outlet socket 5 is connected to outlet chamber 11. Valve 8 is formed by a closure member 12 having the shape of a ball and arranged in inlet chamber 7 and by a valve seat 13 at the inlet chamber end of stepped piston 9.

Stepped piston 9 includes a section 14 having a large active end surface A1 guided in housing bore 16 and a section 17 having a smaller active end surface A2 guided in a sleeve 19. Section 14 is sealed in bore 16 by seal 15 and section 17 is sealed in sleeve 19 by a seal 18. Sleeve 19, on its part, is guided in a housing bore 21 with the total end surface A3. Sleeve 19 is sealed in bore 21 by seal 18. In the rest position, a spring 22 presses sleeve 19 against a stop 23, formed by a retaining ring fastened in bore 21, and at the same time loading stepped piston 9 via a step 25 and a supporting ring 24 positioned in step 25. Spring 22 is housed in a chamber 26 communicating with the atmosphere via a sealing arrangement 27.

At the inlet port end, sleeve 19 has a stop 28 against which, in the normal position, closure member 12 is pressed by an abutment 29 under the influence of a weak spring 30. Abutment 29 includes a plate having one end position defined by a stop 31 and the other end position defined by a surface 32. In the plate, holes 33 are provided for communication between antechamber 6 and inlet chamber 7.

A4 designates the free cross-section of valve seat 13. Normally, stop 28 keeps closure member 12 at a minimum distance S1 with respect to valve seat 13. Until sleeve 19 abuts a housing step 34 it may travel a displacement distance S2 which exceeds the minimum stroke S1. The displacement stroke S3 of abutment 29 is rated so as to allow closure member 12 to lift off of seat 13 even if stepped piston 9 has adopted its right-hand end position which is predetermined by the constructional conditions and by the maximum level of inlet pressure Pe.

Figure 2:
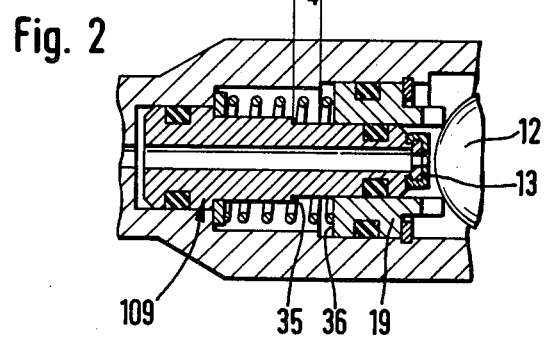
FIG. 2 is a partial longitudinal cross sectional view of a second embodiment of a deceleration-sensitive braking pressure control device in accordance with the principles of the present invention.

In FIG. 2, a stepped piston 109, corresponding to piston 9 of FIG. 1, is illustrated which has an additional step 35 for the determination of the above-mentioned right-hand end position of the stepped piston. Step 35 may abut at the front face 36 of the sleeve 19. This will happen if sleeve 19, on its part, is abutting at housing step 34. The thus defined displacement distance S4 of stepped piston 109 consequently must be smaller than S1–S3 in order to ensure that valve 8 will open even in the extreme position.

Such a braking pressure control device will be mounted in a motor vehicle so as to position the inlet port end lower than the outlet port end. As a rule, the brake circuit for the rear wheels includes the control device while the brake circuits for the front wheels will be supplied directly with the pressure of the master cylinder. Referring to the graph in FIG. 3, this will mean that the braking pressure for the front axle is traced on the abscissa while the braking pressure for the rear axle is traced on the ordinate. Such a control device automatically works dependent on the loading of the vehicle, since with a higher load a corresponding deceleration will only result with a higher braking pressure, thus the change-over pressure automatically rises.

The mode of operation will be explained in more detail, reference being made to FIG. 3. The ideal curve B is for an empty vehicle. The ideal curve C is for a loaded vehicle. The actual course of the curve during normal operation will be as follows. With inlet pressure Pe continuously increasing, outlet pressure Pa will follow the steeper characteristic curve D along the first branch D1. Valve 8 cannot close before the change-over pressure P1 has been reached, since stop 28 keeps closure member 12 at a distance S1 with respect to valve seat 13. When reaching the change-over pressure P1, however, the surface (A3–A2) of sleeve 19, which borders inlet chamber 7, is acted upon by such a force that, spring 22 is compressed and sleeve 19 will move by such a portion of the distance S2 to the left that closure member 12 will engage valve seat 13. Whether and when this will happen beyond the change-over pressure P1 will depend on the loading and the momentary deceleration of the vehicle. In an empty vehicle, e.g. valve 8 may close immediately at change-over pressure P1. Thus, the horizontal section E1 of the curve becomes effective. In section E1, inlet pressure Pe will increase and outlet pressure Pa will remain constant until the straight line F is reached whose inclination will equal the surface ratio (A2–A4):(A1–A4). With a further increase of inlet pressure Pe, the branch F1 of the curve will be followed. However, if the vehicle is loaded, valve 8 will not close until a higher inlet pressure Pe has been reached. Thus, the course of the curve indicated by a dot-dash line along sections D2 and E2 up to branch F1 will result.

Figure 3:
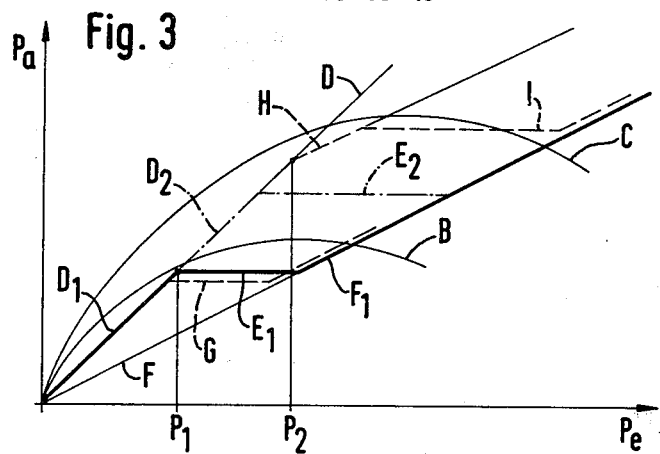
FIG. 3 is a graph illustrating the outlet pressure Pa dependent on the inlet pressure Pe.

Broken lines in FIG. 3 indicate the behavior of the control device in case of a malfunction. The actual working range cannot lie outside the broken lines. If independently of a deceleration, e.g. as a result of a vibration, closure member 12 directly follows the stop 28 there will result section G following branch D1 of the curve close to section E1. If closure member 12 should not move out of its rest position under the influence of the deceleration forces stepped piston 9 will travel to the right until valve 8 will close which will happen after the minimum distance S1 has been travelled at the pressure P2 and which will depend on the surface ratio of A1:A2 and on spring 22. As soon as valve 8 has closed, closure member 12 will be acted upon by a deceleration force directed to the left and displaces stepped piston 9 to the left. At the same time there will be a decompression of spring 22. This will result in section H of the broken line curve. With inlet pressure Pe increasing, closure member 12 will abut at stop 28. Valve 8, however, will remain closed until the inlet pressure will have risen such that the pressure equation Pe (A2–A4)=Pa (A1–A4) will have been complied with, resulting in the horizontal section I of the broken line curve. As soon as the straight line F is reached the control device will work in the usual manner along this straight line. In this way, it is ensured, that even in case of a malfunction of closure member 12, the desired change-over to a reduced ratio between the inlet and outlet pressures will be achieved. Thus, a lock-up of the rear wheels is prevented.

In addition, the central hole 33 in the plate-type abutment 29 will ensure that an emergency operation in which the sections H and I of the curve of FIG. 3 are followed will occur in very rare exceptional cases only, since the supplied pressure medium will exert an additional force on closure member 12.

While I have described above the principles of my invention in connection with specific apparatus, it is to be clearly understood that this description is made only by way of example and not as a limitation to the scope of my invention as set forth in the objects thereof and in the accompanying claims.

I claim:

1. A deceleration-sensitive braking pressure control device for a vehicular hydraulic brake system comprising:
    a housing having a stepped bore coaxial of a longitudinal axis;
    a stepped piston disposed in said bore coaxial of said axis, said piston including a first section having a relatively small active surface facing a braking pressure inlet chamber disposed in said bore and a second section sealed to and slidable in said bore, said second section having a relatively large active surface facing a braking pressure outlet chamber disposed in said bore;
    a sleeve disposed in said bore in a slidable sealed relationship therewith encircling a first portion of said first section in a slidable sealed relationship therewith;
    a first spring disposed in said bore between a first step in said piston joining said first and second sections and the adjacent end of said sleeve to preload said piston;
    a channel disposed in said piston coaxial of said axis enabling said inlet chamber to communicate with said outlet chamber;
    a valve including a valve seat disposed adjacent said small active surface in an operative relationship with an adjacent end of said channel and a closure member disposed in said inlet chamber movable therein in an operative relationship with said valve seat in a deceleration-sensitive manner to control the communication between said inlet and outlet chambers; and
    a stop for said closure member carried by the adjacent end of said sleeve to ensure that in the rest position of said piston a minimum distance is guaranteed between said closure member and said valve seat, said sleeve being displaceable by inlet pressure against the force of said first spring by an amount greater than said minimum distance.

2. A control device according to claim 1, wherein said closure member is a deceleration-sensitive ball.

3. A control device according to claims 1 or 2, further including
    an abutment for said closure member disposed in said bore on the side of said closure member remote from said stop, said abutment and said stop being spaced from each other an amount approximately equal to the length of said closure member, said abutment being displaceable by a given amount against the force of a second spring.

4. A control device according to claim 3, wherein said abutment presses said closure member against said first stop in the rest position of said sleeve when said abutment is in a position adjacent its undisplaced end position.

5. A control device according to claim 4, wherein said abutment is a plate transverse of said axis separating said inlet chamber from an associated inlet socket, said plate having at least one hole therethrough.

6. A control device according to claim 5, wherein movement of said piston in the direction of said inlet chamber is limited by a second step in said piston disposed in said first section.

7. A control device according to claim 6, wherein the adjacent end of said sleeve engages said second step to limit movement of said piston in the direction of said inlet chamber.

8. A control device according to claim 4, wherein movement of said piston in the direction of said inlet chamber is limited by a second step in said piston disposed in said first section.

9. A control device according to claim 8, wherein The adjacent end of said sleeve engages said second step to limit movement of said piston in the direction of said inlet chamber.

10. A control device according to claim 3, wherein said abutment is a plate transverse of said axis separating said inlet chamber from an associated inlet socket, said plate having at least one hole therethrough.

11. A control device according to claim 10, wherein movement of said piston in the direction of said inlet chamber is limited by a second step in said piston disposed in said first section.

12. A control device according to claim 11, wherein the adjacent end of said sleeve engages said second step to limit movement of said piston in the direction of said inlet chamber.

13. A control device according to claim 3, wherein movement of said piston in the direction of said inlet chamber is limited by a second step in said piston disposed in said first section.

14. A control device according to claim 13, wherein the adjacent end of said sleeve engages said second step to limit movement of said piston in the direction of said inlet chamber.

* * * * *